US006414859B1

United States Patent
Zhang (10) Patent No.: US 6,414,859 B1
(45) Date of Patent: Jul. 2, 2002

(54) PASSIVE CIRCUITY FOR HARMONIC CURRENT REGULATION IN A POWER SUPPLY BY ENERGY EFFICIENT INPUT CURRENT SHAPING

(75) Inventor: Binbin Zhang, Singapore (SG)

(73) Assignee: Speedy-Tech Electronics (S) PTE LTD, Singapore (SG)

( * ) Notice: Subject to any disclaimer, the term of this patent is extended or adjusted under 35 U.S.C. 154(b) by 0 days.

(21) Appl. No.: 09/663,888

(22) Filed: Sep. 18, 2000

(30) Foreign Application Priority Data

Apr. 10, 2000 (SG) .......................... 200001963

(51) Int. Cl.⁷ ............................... H02M 1/14
(52) U.S. Cl. ........................................ 363/44
(58) Field of Search ............................. 363/44, 47, 48

(56) References Cited

U.S. PATENT DOCUMENTS 5,661,348 A * 8/1997 Brown ........................ 363/21
5,714,846 A * 2/1998 Rasch et al. .................. 363/44
5,736,842 A * 4/1998 Jovanovic ..................... 363/21
5,757,626 A * 5/1998 Jovanovic et al. ............. 363/21
6,141,230 A * 10/2000 Sum ............................ 363/44

FOREIGN PATENT DOCUMENTS

| EP | 0602908 | 6/1994 | .......... H05B/41/29 |
| EP | 0600340 | 1/1997 | .......... H05B/41/29 |
| WO | 9222953 | 12/1992 | .......... H02M/1/12 |

* cited by examiner

Primary Examiner—Jeffrey Sterrett
(74) Attorney, Agent, or Firm—Ladas & Parry (57) ABSTRACT

A passive component circuit comprising a bridge rectifier and is coupled in parallel to three capacitors; each of the first two capacitors is clamped in series by at least one diode and there in between is disposed another diode and a resistor for shaping the input current waveform such that it falls outside the Class D envelope of the limits on harmonic currents emissions. As such, power supplies incorporating such a passive circuit qualify automatically as Class A devices without further regards to power factor conversion and EMI filtering. Therefore, an economic strategy for complying with harmonic currents emissions limits is realized for low to medium power supplies.

3 Claims, 7 Drawing Sheets

| HARMONIC | READING | LIMIT | RESULT | HARMONIC | READING | LIMIT | RESULT |
|---|---|---|---|---|---|---|---|
| 2 | 1.63mA | None | | 3 | 250mA | 200mA | Fail |
| 4 | 2.31mA | None | | 5 | 236mA | 112mA | Fail |
| 6 | 3.05mA | None | | 7 | 217mA | 59mA | Fail |
| 8 | 3.58mA | None | | 9 | 193mA | 29mA | Fail |
| 10 | 3.74mA | None | | 11 | 166mA | 21mA | Fail |
| 12 | 4.02mA | None | | 13 | 137mA | 17mA | Fail |
| 14 | 4.17mA | None | | 15 | 108mA | 15mA | Fail |
| 16 | 4.22mA | None | | 17 | 80.69mA | 13mA | Fail |
| 18 | 3.96mA | None | | 19 | 55.74mA | 12mA | Fail |
| 20 | 3.63mA | None | | 21 | 34.22mA | 11mA | Fail |
| 22 | 3.22mA | None | | 23 | 17.56mA | 10mA | Fail |
| 24 | 2.80mA | None | | 25 | 8.23mA | 9mA | Pass |
| 26 | 2.10mA | None | | 27 | 10.16mA | 8mA | Fail |
| 28 | 1.57mA | None | | 29 | 13.85mA | 8mA | Fail |
| 30 | 1.04mA | None | | 31 | 15.00mA | 7mA | Fail |
| 32 | 0.45mA | None | | 33 | 13.85mA | 7mA | Fail |
| 34 | 0.26mA | None | | 35 | 10.92mA | 6mA | Fail |
| 36 | 0.48mA | None | | 37 | 7.02mA | 6mA | Fail |
| 38 | 0.87mA | None | | 39 | 2.99mA | 6mA | |
| 40 | 1.07mA | None | | | | | |

| HARMONIC | READING | LIMIT | RESULT | HARMONIC | READING | LIMIT | RESULT |
|---|---|---|---|---|---|---|---|
| 2 | 0.93mA | 1.080A | | 3 | 62.87mA | 2.300A | Pass |
| 4 | 0.68mA | 430mA | | 5 | 37.33mA | 1.140A | Pass |
| 6 | 0.95mA | 300mA | | 7 | 110mA | 770mA | Pass |
| 8 | 0.71mA | 230mA | | 9 | 57.71mA | 400mA | Pass |
| 10 | 0.57mA | 184mA | | 11 | 32.47mA | 330mA | Pass |
| 12 | 0.52mA | 153mA | | 13 | 63.94mA | 210mA | Pass |
| 14 | 0.26mA | 131mA | | 15 | 32.67mA | 150mA | Pass |
| 16 | 0.38mA | 115mA | | 17 | 12.60mA | 132mA | Pass |
| 18 | 0.17mA | 102mA | | 19 | 29.30mA | 118mA | Pass |
| 20 | 0.29mA | 92mA | | 21 | 10.98mA | 107mA | Pass |
| 22 | 0.32mA | 84mA | | 23 | 9.05mA | 98mA | Pass |
| 24 | 0.14mA | 77mA | | 25 | 10.27mA | 90mA | Pass |
| 26 | 0.29mA | 71mA | | 27 | 7.76mA | 83mA | Pass |
| 28 | 0.14mA | 66mA | | 29 | 13.48mA | 78mA | Pass |
| 30 | 0.19mA | 61mA | | 31 | 8.41mA | 73mA | Pass |
| 32 | 0.12mA | 58mA | | 33 | 7.22mA | 68mA | Pass |
| 34 | 0.16mA | 54mA | | 35 | 10.04mA | 64mA | Pass |
| 36 | 0.22mA | 51mA | | 37 | 8.11mA | 61mA | Pass |
| 38 | 0.18mA | 48mA | | 39 | 4.06mA | 58mA | |
| 40 | 0.10mA | 46mA | | | | | |

FIG. 7

PASSIVE CIRCUITY FOR HARMONIC CURRENT REGULATION IN A POWER SUPPLY BY ENERGY EFFICIENT INPUT CURRENT SHAPING

FIELD OF THE INVENTION

The present invention relates to a method and apparatus for shaping input waveform of power supply equipment for meeting harmonic current emissions standards. In particular, the present invention pertains to a passive component circuitry for shaping input current waveform for complying with harmonic current emissions regulations in low to medium power supply equipment.

BACKGROUND OF THE INVENTION

Although harmonic currents emissions standards such as "Electromagnetic Compatibility (EMC)—Part 3: Limits—Section 2, Limits for harmonic current emissions (equipment input current ≦16 A per phase)", IEC 1000-3-2 Document, First Edition, 1995 (hereinafter IEC-1000-3-2) has been published some time ago, its impact on the ability of power supply manufacturers to export its low to medium range equipment has not been felt until 2000. For the first time, power supplies with input power exceeding 50 W are subjected to the IEC-1000-3-2 regulations in the Europe. A large variety of consumer electrical and electronic devices such as personal computers, printers, scanners and other accessories incorporate power supplies that come under the purview of IEC-1000-3-2.

It is well known in the field to rely on active power factor conversion or current conditioning to comply with IEC-1000-3-2. Prior art examples of active power factor conversion include U.S. Pat. Nos. 5,736,842 and 5,757,626. While active power factor conversion limits harmonic current emissions effectively, the power supplies are costly, complex and may be less reliable. Often the electromagnetic interference filters of active power factor conversion at the input stage are complicated.

U.S. Pat. No. 5,661,348 shows a typical example of current conditioning with inductors or chokes to meet limits imposed by lEC-1000-3-2. Inductors are simply and reliable devices but their bulk and weight impose considerable design constraints on modem consumer electrical or electronic devices that emphasize compactness and lightweight.

OBJECT OF THE INVENTION

It is an object of the present invention to shape the input current waveform of a power supply so that it complies with harmonic current emission limits with passive components.

It is another object of the present invention to meet the harmonic current emission limits economically without relying on complex and unreliable filters and circuitry.

It is yet another object of the present invention to shape the input current waveform of a power supply in complying with harmonic current emission limits without paying excessive overhead for power factor conversion.

SUMMARY OF THE INVENTION

A passive component circuit comprising a bridge rectifier and is coupled in parallel to three capacitors; each of the first two capacitors is clamped in series by at least one diode and there in between is disposed another diode and a resistor for shaping the input current waveform such that it falls outside the Class D envelope of the limits on harmonic currents emissions. As such, power supplies incorporating such passive components meets automatically the criteria for Class A devices without further regards to power factor conversion and EMI filtering. Therefore, an economic strategy for complying with harmonic currents emissions limits is realised for low to medium power supplies.

DETAILED DESCRIPTION OF THE INVENTION

Figure 1:
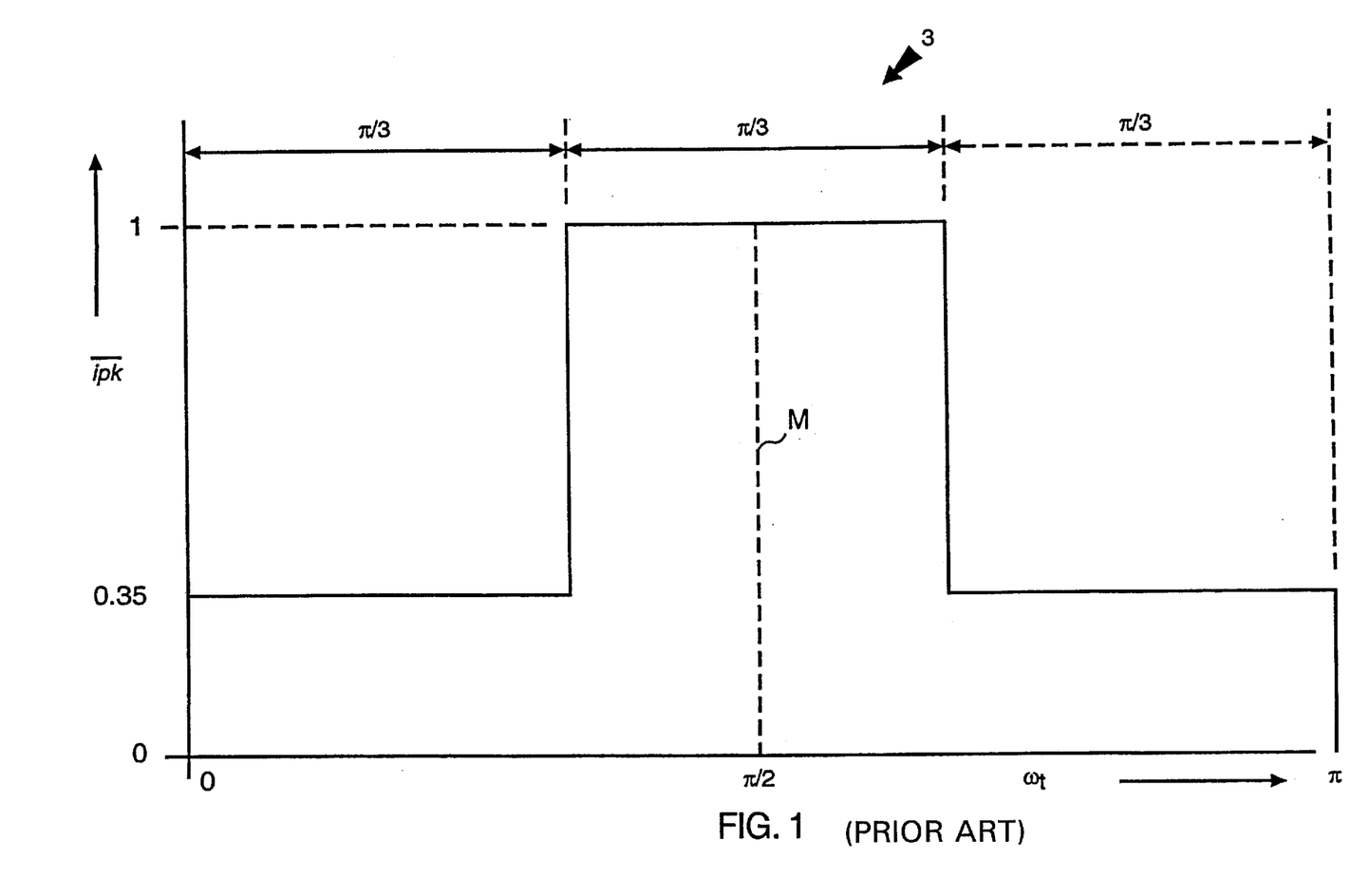
FIG. 1 is the special wave shape envelope of input current to classify equipment as Class D.

FIG. 1 is the envelope of an input current to define the "special wave shape" and to classify equipment as Class D. Referring to IEC1000-3-2, page 17, equipment shall be deemed to be Class D if two specific conditions are met: (1) the input power is less than or equal to 600 Watts; and (2) the input current wave shape of each half-period—referred to its peak value, $i_{pk}$—is within the envelope 3 as given in FIG. 1 for at least 95% of the duration of each half-period. This implies that waveforms having small peaks outside the envelope 3 are considered to fall within the envelope. The center line, M, coincides with the peak value of the input current.

Figure 2:
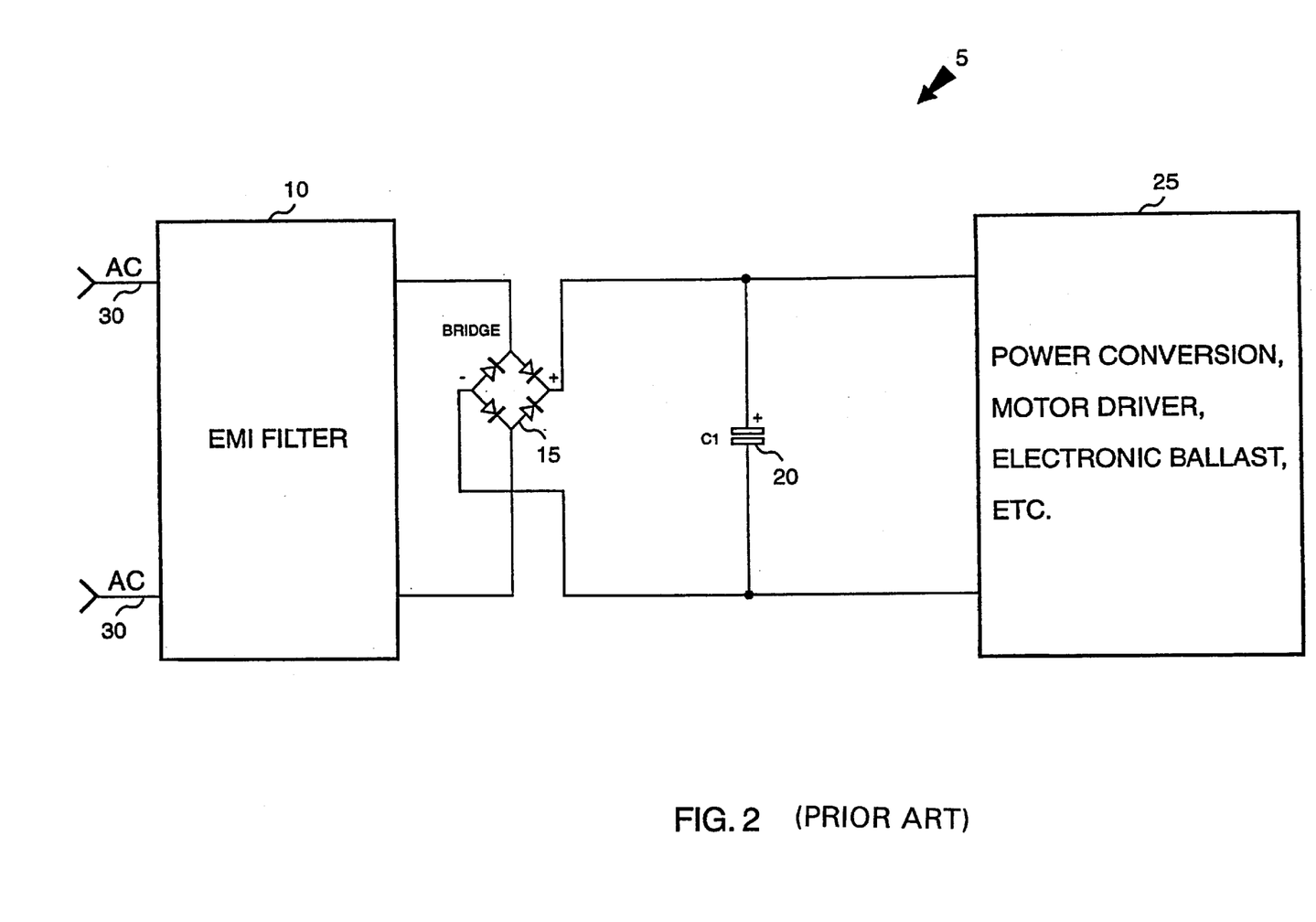
FIG. 2 is a prior art power supply circuitry for filtering ripples from an alternating current (AC) source.

FIG. 2 is a prior art power supply circuitry for filtering ripples from an alternating current (AC) source. The power supply 5 comprises at least an electromagnetic interference (EMI) filter 10, a bridge rectifier 15 and a capacitor 20. The EMI filter 10 receives at its input 30 alternating current (AC) source; the output of the EMI filter is provided as input to the bridge rectifier 15. The output of the bridge rectifier 15 is coupled in parallel to the filtering capacitor 20 before its output (i.e., unregulated direct current) is provided as input to a power conversion device 25. It should be understood by one skilled in the art that the power conversion device 25 could be motor driver, electronic ballast or other equivalent devices. It should further be understood by one skilled in the art that the power conversion device is coupled (not shown in FIG. 2) to system or device that require direct current (DC) source to operate such as printer, facsimile machine and personal computer etc.

Figure 3:
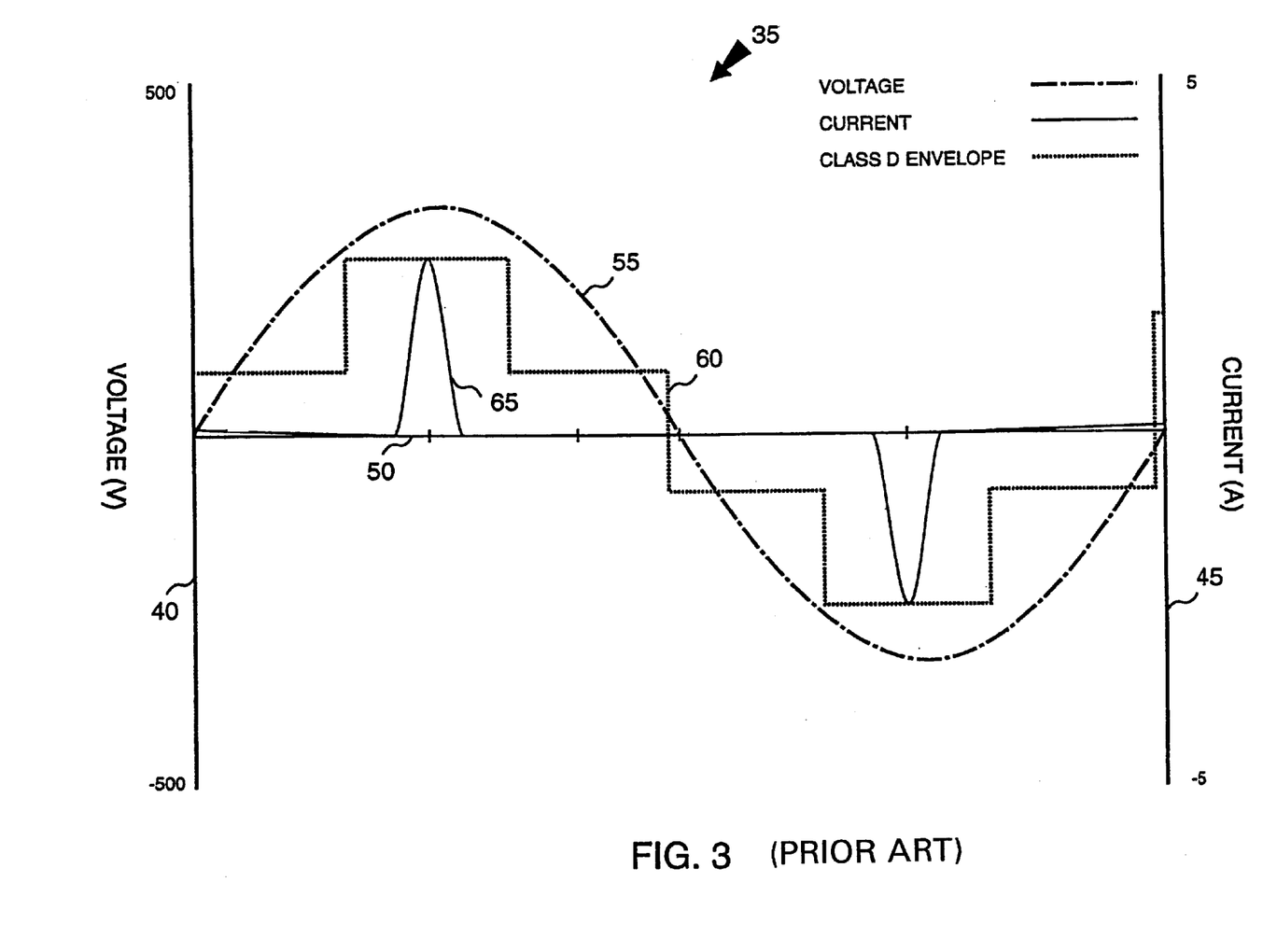
FIG. 3 is an input waveform sample of the circuit as shown in FIG. 2.

FIG. 3 is an input waveform sample of the circuit as shown in FIG. 2. The total input power for this sample waveform is 59 Watts. The current waveform of power supply circuit 5 is referenced by a voltage axis 40 on the left, a current axis 45 on the right and a time axis 50. The input waveform 35 further displays a sinusoidal wave 55 for the input AC voltage, a Class D envelope 60, and an input current curve 65. In the preferred embodiment of the present invention, the power supply circuit 5 is tested on a power analyzer featuring IEC 1000-3 Windows Software 2.02. The input current waveform 65 is unshaped and the entire waveform is enveloped by the Class D envelope 60. It follows that the circuit as shown in FIG. 2 is deemed to be a Class D equipment as It meets the conditions for such.

Figure 4:
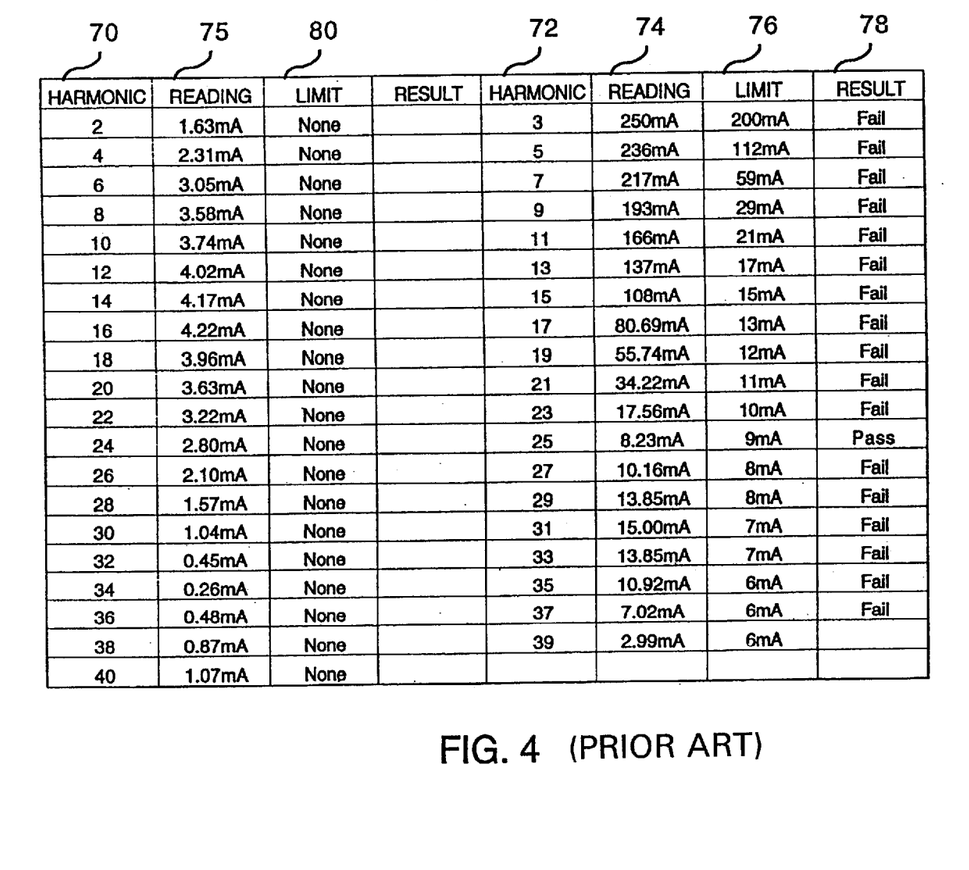
FIG. 4 is a table showing the results of a test for harmonic current emissions with reference to Class D limits for the waveform sample in illustrated in FIG. 3.

Referring to FIG. 4, a table detailing the even harmonics in column 70, and odd harmonics in column 72 and the corresponding current readings in columns 75 and 74 is aligned against the Class D limits in columns 80 and 76 respectively. As expected, the input current waveform of power supply circuit 5 does not pass the harmonic current emissions tests. In particular, almost all the odd harmonics exceeds the Class D limits 76 and therefore power supply circuit 5 in FIG. 2 fails the IEC 1000-3-2 test.

As mentioned above, prior art power supplies rely on active power factor conversion or current conditioning to comply with IEC-1000-3-2. The present invention illustrates in FIGS. 5 –7 with a new power supply circuit 85 that compliance with IEC 1000-3-2 is achieved by shaping the input current waveform alone. The foundation of the present invention is based on the observation that if two requirements are met, then power supply circuits incorporating the present invention comply with IEC 1000-3-2: (1) the input power is less than or equal to 200 Watts; and (2) the input current waveform is not Class D. With reference to the present invention and will be illustrated below, the input current waveform is shaped to meet Class A limits by increasing the duration of input current whose waveform is outside of the Class D envelope by more than 5% for each half period.

Figure 5:
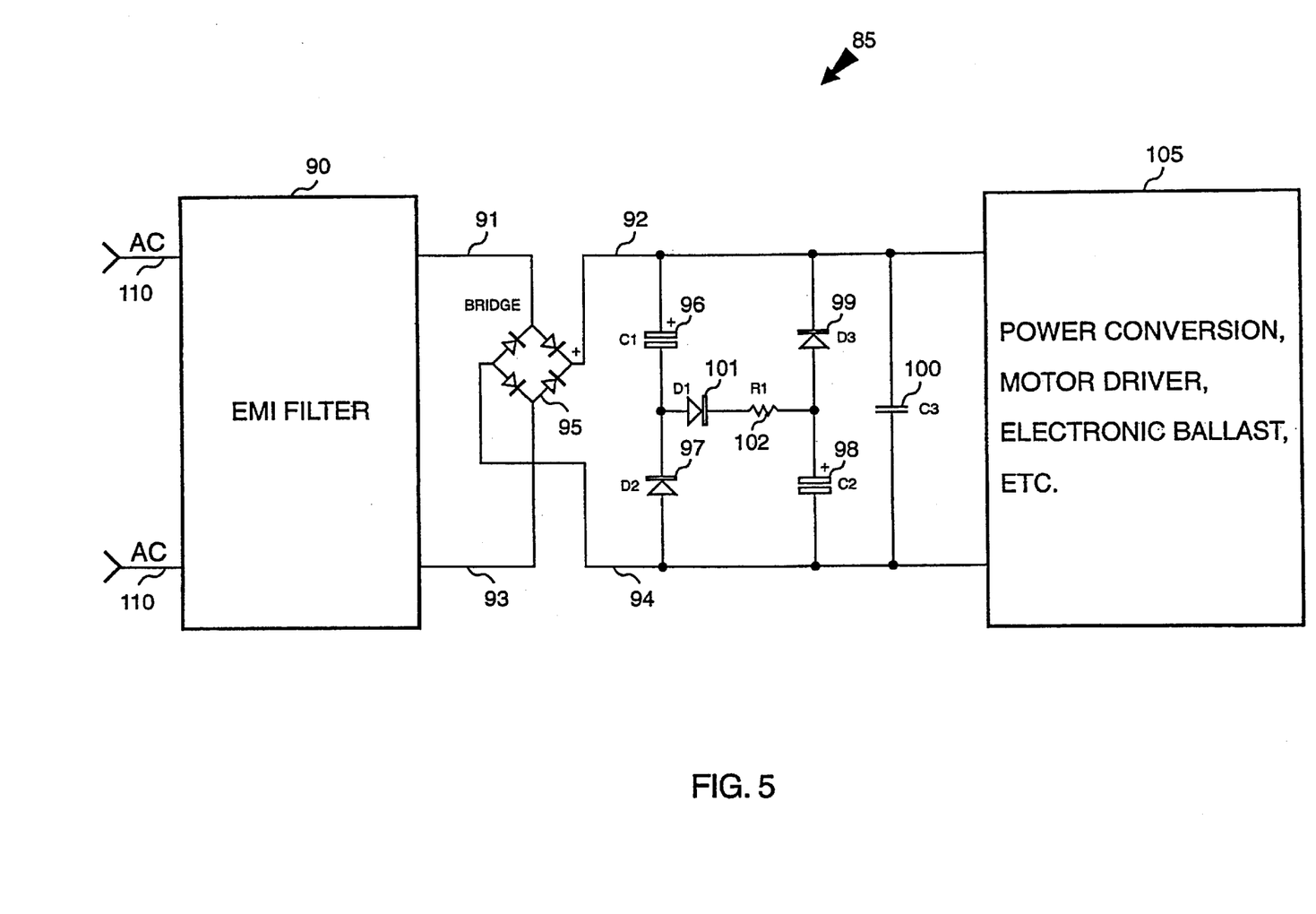
FIG. 5 is a power supply circuit for shaping input current waveform according to the present invention.

FIG. 5 is a power supply circuit for shaping input current waveform according to the present invention. The circuit 85 comprises an EMI filter 90, a bridge rectifier 95, capacitors 96, 98 and 100, diodes 97 and 99 and finally a diode 101 and a resistor 102. The EMI filter 90 is coupled at its input to AC power source 110. The outputs 91 and 93 from the EMI filter 90 are coupled to the input of the bridge rectifier 95. The outputs 92 and 94 of the bridge rectifier 95 are coupled in parallel to the bulk capacitors 96, 98 and 100 respectively. The capacitor 96, 98 are clamped with the diodes 97, 99 respectively to form two discharging paths. Additionally, the capacitors 96, 98 are coupled in series with the diodes 101 and resistor 102 to form a charging path. Finally, the outputs 92 and 94 is coupled to a power conversion device 105.

Figure 6:
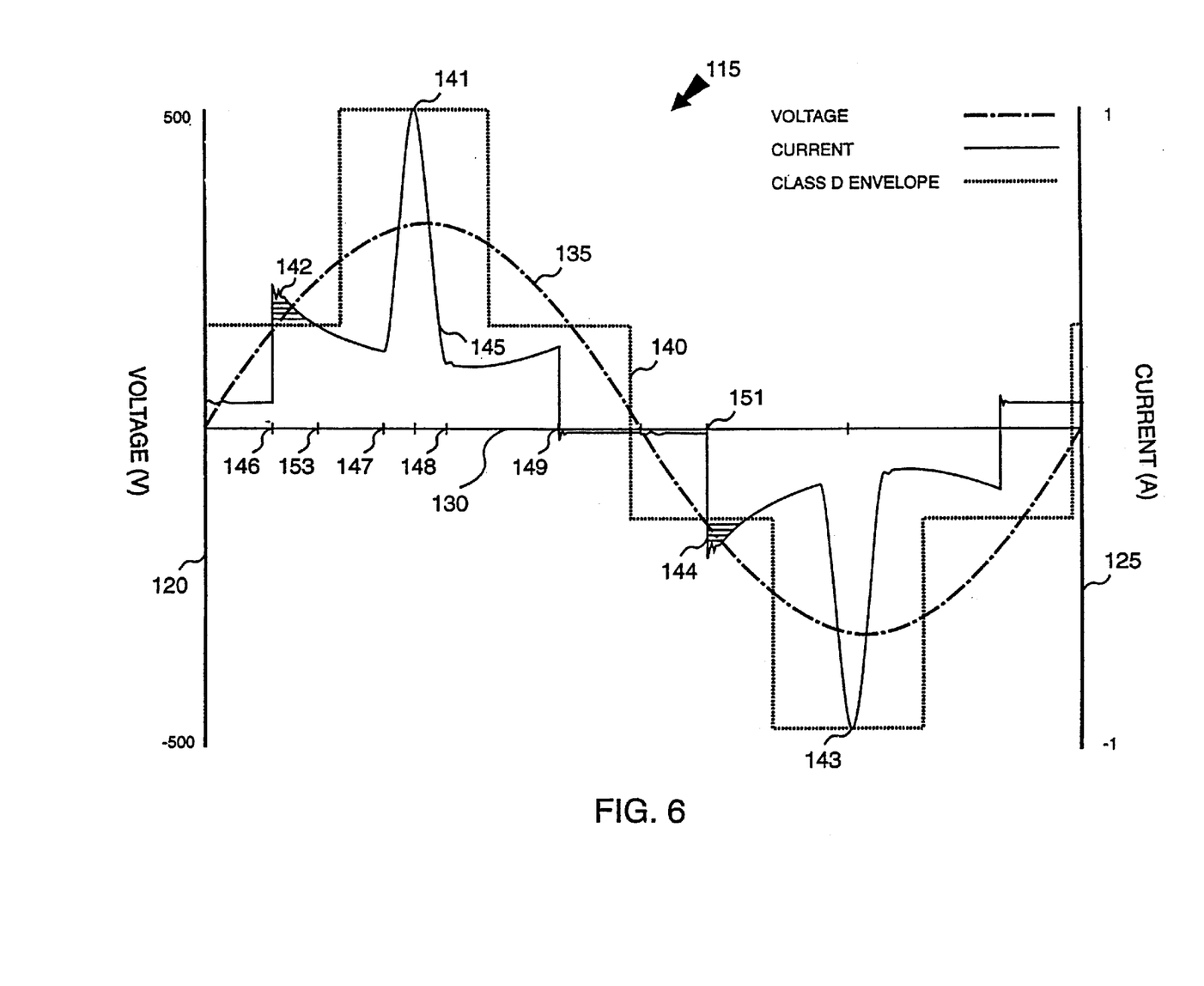
FIG. 6 is an input waveform sample of the circuit of the present invention as shown in FIG. 5.

FIG. 6 is an input waveform sample of the circuit of the present invention. The total input power of this waveform sample is 57.8 Watts. The waveform 115 is referenced by a voltage axis 120 on the left, a current axis 125 on the right, and a time axis 130. The input waveform 115 further displays a sinusoidal voltage 135 for the input AC voltage, a Class D envelope 140 and an input current-curve 145. Like the curve 35 in FIG. 3, the peak value of the input current waveform of each half-period falls within that of the envelope. In FIG. 6, the peak values are points 141 and 143. Unlike the curve 35 in FIG. 3, the current waveform 145 is shaped by the circuit 85 to have non-Class D envelope waveform. In other words, the duration for the area 142 under the curve 145 and above the Class D envelope 140 is increased by more than 5%. Under IEC 1000-3-2, power supply equipment incorporating the circuit 85 is considered a Class A equipment.

Referring again to circuit 85 in FIG. 5 and the waveform 115 in FIG. 6: at interval 146 to 147, the input voltage 135 (shown in FIG. 5) is greater than the individual voltage across each of the capacitor 96 and 98 but less than the sum of voltages across the capacitors 96 and 98. Output lines 92 and 94 provide energy to the application circuit (not shown) and charge the capacitors 100.

At interval 147 to 148, the input voltage 135 is greater than the sum of voltages across the capacitors 96 and 98. Output lines 92 and 94 provide energy to the application circuit (not shown) and charge the capacitors 96 and 98 through the diode 101 and the resistor 102. Here, the resistor 102 suppresses the peak charging current.

At interval 149 to 151, the input voltage 135 is less than the sum of voltages across the capacitors 96 and 98 but higher than the individual voltage across each of the capacitors 96 and 98. Output lines 92 and 94 provide energy or current to the application circuit (not shown) and charge the capacitor 100.

At interval 147 to 148, the input voltage 110 is less than the individual voltage across each of the capacitor 96 and 98. The capacitor 96 and 98, which are in series with diode 97 and 99 respectively, parallel with capacitor 100 provide energy to the application circuit (not shown). At this moment, the input current will drop to near zero. During the discharge of capacitor 96 and 98, the diode 101 isolates the two discharging current paths.

In order to ensure that the current waveform falls outside the Class D envelope, resistor 102 and capacitor 100 are introduced into the circuit. The resistor 102 which is in series with diode 101 will suppress the peak charging current 141 without affecting the peak area 142. Whereas the capacitor 100 will further increase the duration of the input current waveform which is outside of the Class D envelope by more than 5% within each half period.

This is the shaping process for the waveform and is illustrated by the curve between intervals 146 and 153 on the time axis in FIG. 6. With the unique arrangement of capacitors, diodes and resistors of the present circuit, shaping of the waveform to comply with Class A will be possible.

Figure 7:
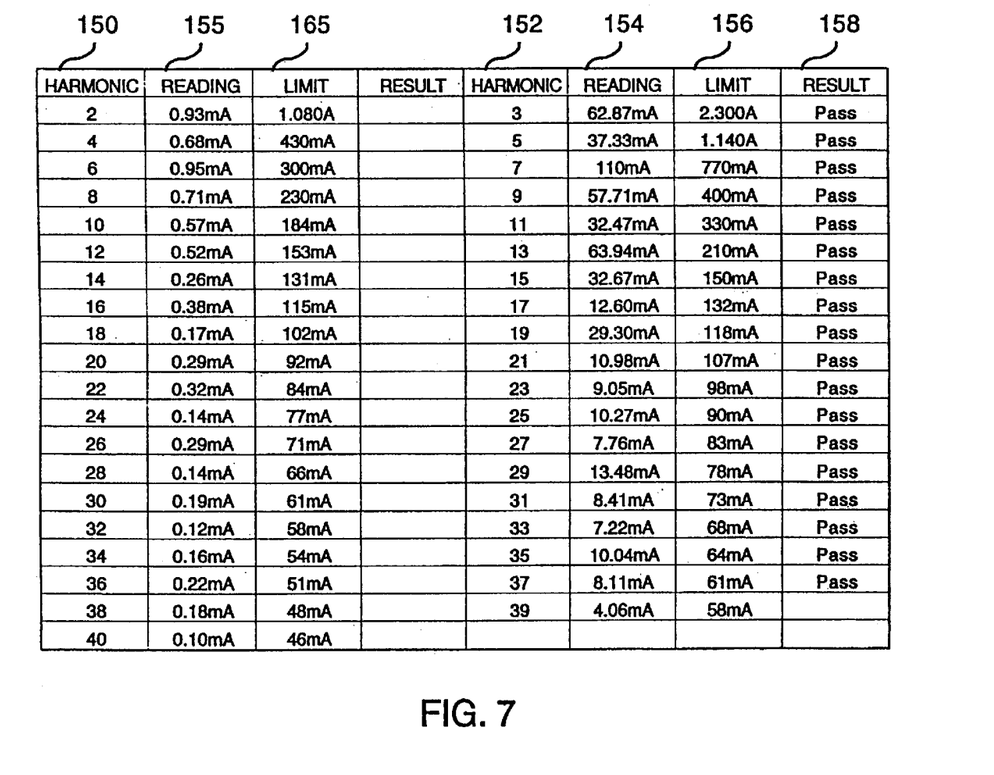
FIG. 7 is a table showing the results of a test for harmonic current emissions with reference to Class A limits for the waveform sample as shown in FIG. 6.

FIG.7 is a table showing the results of a test for harmonic current emissions for the input waveform 115 in FIG. 6. The even and odd harmonics are listed in columns 150 and 152, while the harmonic current readings are shown in columns 155 and 154 respectively. Measured against the Class A harmonic current limits under IEC 1000-3-2 as listed in columns 165 and 156 respectively, the test results confirm that the power supply equipment incorporating the present invention complies with the harmonic current emissions limits.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

What is claimed:

1. An energy efficient apparatus for shaping input waveforms in complying with harmonic current emission limits standards, said apparatus being interposed between at least one alternating current (AC) power source and at least one power conversion means for providing power thereto, said apparatus comprising:

at least one bridge rectifier having at least one first and one second input terminals and at least one first and at least one second output terminals, said first and second input terminals being coupled to said AC power source, said first and second output terminals being coupled to said power conversion means;

at least one first and second capacitors being coupled in parallel with said first and second output terminals of said bridge rectifier, said first and second capacitors being further coupled in series respectively with at least one first and second diodes, said first and second capacitor being further coupled in series with at least one third diode and a resistor, at least one third capacitor being coupled in parallel with said first and second output terminals of said bridge rectifier for filtering said input waveforms;

said resistor for suppressing the peak input current and said third capacitor for ensuring a predetermined duration of said input wave forms fall outside of a predetermined classification;

said predetermined duration of said input wave forms is at least five percent of a half period; and said predetermined classification is Class D of IEC-1000-3-2;

whereby said waveform shaping apparatus shapes input waveforms without relying on any active components.

2. The energy efficient apparatus for shaping input wave forms as in claim 1 wherein said capacitors, diodes and resistors are passive components.

3. A method for shaping input current wave form for complying with Class A of IEC-1000-3-2, steps comprising:

a. ensuring input power is less than or equal to two hundred watts; and b. ensuring current input wave form is classified under Class A of IEC-1000-3-2 by implementing a waveform shaping apparatus, whereby said current input waveform is shaped to meet requirements of Class A of IEC-1000-3-2 by ensuring at least five percent of said input wave form falls outside of a current envelope of Class D of IEC-1000-3-2 classification and said waveform shaping apparatus shapes input waveforms without relying on any active components.

* * * * *